United States Patent
Skelton et al.

(10) Patent No.: US 8,272,201 B2
(45) Date of Patent: Sep. 25, 2012

(54) MEANS FOR COOLING A BEARING ASSEMBLY

(75) Inventors: Lee Skelton, Bristol (GB); John Ingle, Bristol (GB); Andrew Gwynne, Staffs (GB); Clary Susanne I. Svensdotter, Le Creusot (FR)

(73) Assignee: Rolls-Royce PLC, London (GB)

( * ) Notice: Subject to any disclaimer, the term of this patent is extended or adjusted under 35 U.S.C. 154(b) by 966 days.

(21) Appl. No.: 12/071,034

(22) Filed: Feb. 14, 2008

(65) Prior Publication Data
US 2008/0245051 A1    Oct. 9, 2008

(30) Foreign Application Priority Data
Apr. 5, 2007 (GB) .................................. 0706869.5

(51) Int. Cl.
*F02C 7/12* (2006.01)
(52) U.S. Cl. ........ 60/39.091; 60/39.83; 60/779; 60/782; 60/788; 60/806; 415/180; 701/99; 701/100
(58) Field of Classification Search .................. 60/39.08, 60/39.091, 39.83, 778, 779, 782, 786, 788, 60/806; 415/180; 701/100, 99; 73/23.25
See application file for complete search history.

(56) References Cited

U.S. PATENT DOCUMENTS

| | | | |
|---|---|---|---|
| 2,617,253 A | 11/1952 | Fusner et al. | |
| 3,548,565 A | 12/1970 | Toesca | |
| 4,350,008 A * | 9/1982 | Zickwolf, Jr. | .............. 60/39.281 |
| 4,733,529 A * | 3/1988 | Nelson et al. | .............. 60/39.091 |
| 4,854,120 A | 8/1989 | Nelson et al. | |
| 6,139,263 A | 10/2000 | Klingels | |
| 6,321,526 B1 * | 11/2001 | Hamana | ......................... 60/775 |
| 6,358,001 B1 | 3/2002 | Bosel et al. | |
| 6,886,324 B1 * | 5/2005 | Handshuh et al. | ........... 60/39.08 |
| 6,981,841 B2 | 1/2006 | Krammer et al. | |
| 7,118,321 B2 | 10/2006 | Macfadyen | |

FOREIGN PATENT DOCUMENTS
EP    1 180 577 A2    2/2002

OTHER PUBLICATIONS
European Search Report issued in EP Application No. 08 25 0490 on Mar. 7, 2011.

* cited by examiner

*Primary Examiner* — Ehud Gartenberg
*Assistant Examiner* — Steven Sutherland
(74) *Attorney, Agent, or Firm* — Oliff & Berridge, PLC

(57) ABSTRACT

Means for cooling a bearing assembly supporting a rotor stage of a gas turbine engine after engine shutdown. The engine comprises a combustion section, a compressor for the delivery of air to the combustion section, and a bearing assembly supporting a rotor stage. The means for cooling a bearing assembly comprises a means operable to generate a signal representative of turbine duct temperature immediately prior to engine shutdown, a means for determining the duration for cooling after engine shutdown as a function of the signal representative of turbine duct temperature, and the compressor operable as a cooling means to deliver cooling air to the rotor stage after engine shutdown. Thereby the amount of heat conducted to the bearing assembly is limited such that the temperature of the bearing assembly is limited to below a predetermined temperature.

5 Claims, 3 Drawing Sheets

MEANS FOR COOLING A BEARING ASSEMBLY

The invention relates to a means for cooling.

In particular it relates to a means for cooling a bearing assembly supporting a gas turbine engine rotor stage, after engine shutdown.

Operation of a gas turbine engine in an aircraft generates heat. Cooling is provided to components during operation, and may take to form of air, fuel and/or oil cooling. Pumps are employed to force fluid through passages in the components to extract heat. In the case of oil cooling, the oil is then cooled with an oil cooler and re-circulated to continue the cooling process.

Some engine components are deliberately cooled to a greater degree than others. For example a bearing assembly is cooled to a greater degree than a combustor or turbine assembly. However, after engine shutdown the pumps are not operational and forced cooling is stopped. Thus after engine shutdown heat stored in the hotter components will be distributed to cooler components along any available heat conduction paths, for example an engine casing or shaft.

Thus after engine shutdown, while on average the temperature of the engine will diminish with time, some components will experience a significant rise in temperature. For components which contain a fluid, for example fuel injectors and lubricated bearings, this may mean that the fluid is elevated to a temperature hot enough to oxidise the fluid. This is disadvantageous as it will result in solid carbon deposits being formed which will block fluid passageways and hence affect fluid distribution when engine operation is resumed.

In the case of a bearing assembly this may result in insufficient lubricant being delivered to the bearings in use, which will cause excessive wear and overheating, which results in higher operational and post operational temperatures, and hence more oxidation and blockage.

In the case of gas turbine engines it is known to run the engine at low power prior to engine shutdown to lower the average temperature of the components. It is also known to turn the engine over, for example by an auxiliary or starter motor, for a fixed amount of time following every engine operation, such that the fan and/or compressor of the engine are rotated and force cooling air through the engine to cool the components without operating the engine; that is to say, without starting combustion within the engine.

However, such an operation lengthens the overall shutdown time of an engine since time for the cooling procedure is required. Also, it is not always necessary to conduct such a cooling procedure as the engine may not have got sufficiently hot to warrant it, in which case the cooling procedure would be entirely redundant and yet still time consuming. Additionally, increased use of the auxiliary or starter motor results in a requirement for increased servicing of the auxiliary or starter motor, increasing maintenance time and cost of the engine unit as a whole.

Hence a means for cooling a bearing assembly for a gas turbine engine after engine shutdown which reduces component temperature but which does not overcool or cool unnecessarily (that is to say, if the component is not sufficiently hot to warrant cooling) is highly desirable.

According to the present invention there is provided a means for cooling a bearing assembly supporting a rotor stage of a gas turbine engine after engine shutdown, wherein the engine comprises a combustion section, a compressor for delivering air to the combustion section, and a bearing assembly supporting a rotor stage, the means for cooling a bearing assembly comprising a means operable to generate a signal representative of turbine duct temperature immediately prior to engine shutdown, a means for determining the duration for cooling after engine shutdown as a function of the signal representative of turbine duct temperature, and the compressor operable as a cooling means to deliver cooling air to the rotor stage after engine shutdown and thereby limit the amount of heat conducted to the bearing assembly such that the temperature of the bearing assembly is limited to below a predetermined temperature.

The invention thus provides a means for optimally cooling the rotor stage, and hence the bearing assembly which supports the rotor stage, which cools by an amount appropriate to the engine condition at engine shutdown. Turbine duct temperature can be related by extensive experiments, rig testing, engine testing and modelling to the temperature of the rotor stage. In cooling the rotor stage less heat will be conducted to the bearing assembly, and hence the temperature of the bearing assembly after engine shutdown can be limited to a temperature beneath that likely to cause damage to the assembly.

Preferably, the bearing assembly, in use, is supplied with lubricant, and the temperature of the bearing assembly is limited to the predetermined temperature such that the lubricant temperature is maintained below the oxidation temperature of said lubricant.

Preferably the means for determining the duration for cooling after engine shutdown comprises
a) means for calculating rotor stage temperature after engine shutdown as a function of the signal representative of turbine duct temperature immediately prior to engine shutdown;
b) means for calculating an expected bearing assembly temperature after engine shutdown based upon the calculated rotor stage temperature;
c) means for calculating the cooling required to limit bearing assembly temperature to the predetermined temperature, and
d) means for calculating the duration of operation of the cooling means to limit bearing assembly temperature to said predetermined value.

The present invention thus provides a means for calculating the optimum amount of time needed to cooling the bearing assembly based upon known characteristics of the bearing assembly, rotor stage, the material linking the bearing assembly and rotor stage, and the cooling capacity of the cooling means.

The invention will now be described, by way of example only, with reference to the accompanying drawings, in which.

Figure 1:
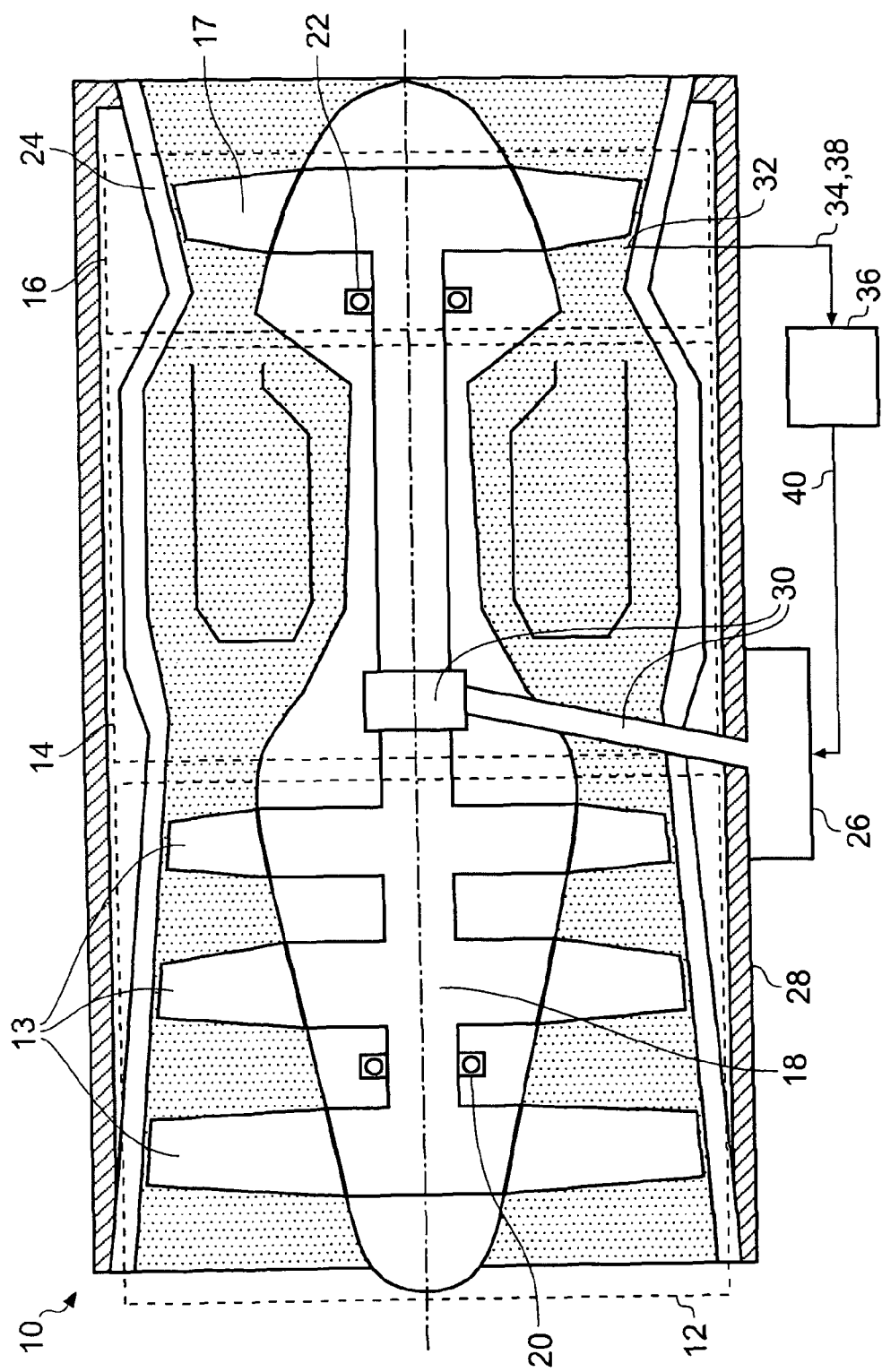
FIG. 1 shows a gas turbine engine provided with a means for cooling a rotor stage bearing assembly according to the present invention.

FIG. 1 shows a gas turbine 10 comprising a compressor 12 with a number of compressor rotor stages 13, a combustion section 14, and a turbine 16 made up of a number of turbine rotor sections 17. A turbine duct wall 24 is provided radially outward of the rotor 17, and forms the outer casing of the turbine section 16. The compressor rotor 13 and turbine rotor 17 are mounted on a common shaft 18. The shaft 18 is rotatably mounted on bearings 20,22 in the compressor section 12 and turbine section 16 respectively. In use the bearing assemblies 20,22 are supplied with a lubricant to reduce friction. The lubricant is also pumped around the bearing assembly 22 in order to keep it cool, heat from the lubricant bearing extracted by a heat exchanger (not shown).

A starter motor 26 is mounted to a casing 28 of the engine 10. The motor 26 is coupled to the shaft 18 by a coupling means 30 (for example, a shaft and gear system). A temperature sensor 32 is located on the turbine duct wall 24 downstream of the exit from the combustion section 14, such that it extends into the gas path. The sensor 32 may be any means operable to generate a signal 34 representative of turbine duct temperature. The sensor 32 is in communication with a cooling cycle calculator 36 via a temperature 34 signal transmission means 38, which is in turn in communication with the starter motor 26 via a cooling cycle signal transmission means 40.

In the embodiment shown in FIG. 1 the cooling cycle calculator 36 is shown as part of the engine control system. However, the calculator 36 may take the form of a separate electronic device or look up table, the temperature signal 34 transmission means 38 may take the form of a temperature readout from a temperature sensor 32, and the cooling cycle signal transmission means 40 may be a separate instruction to the starter motor 26, instructed by a control system or engine operator.

Figure 2:
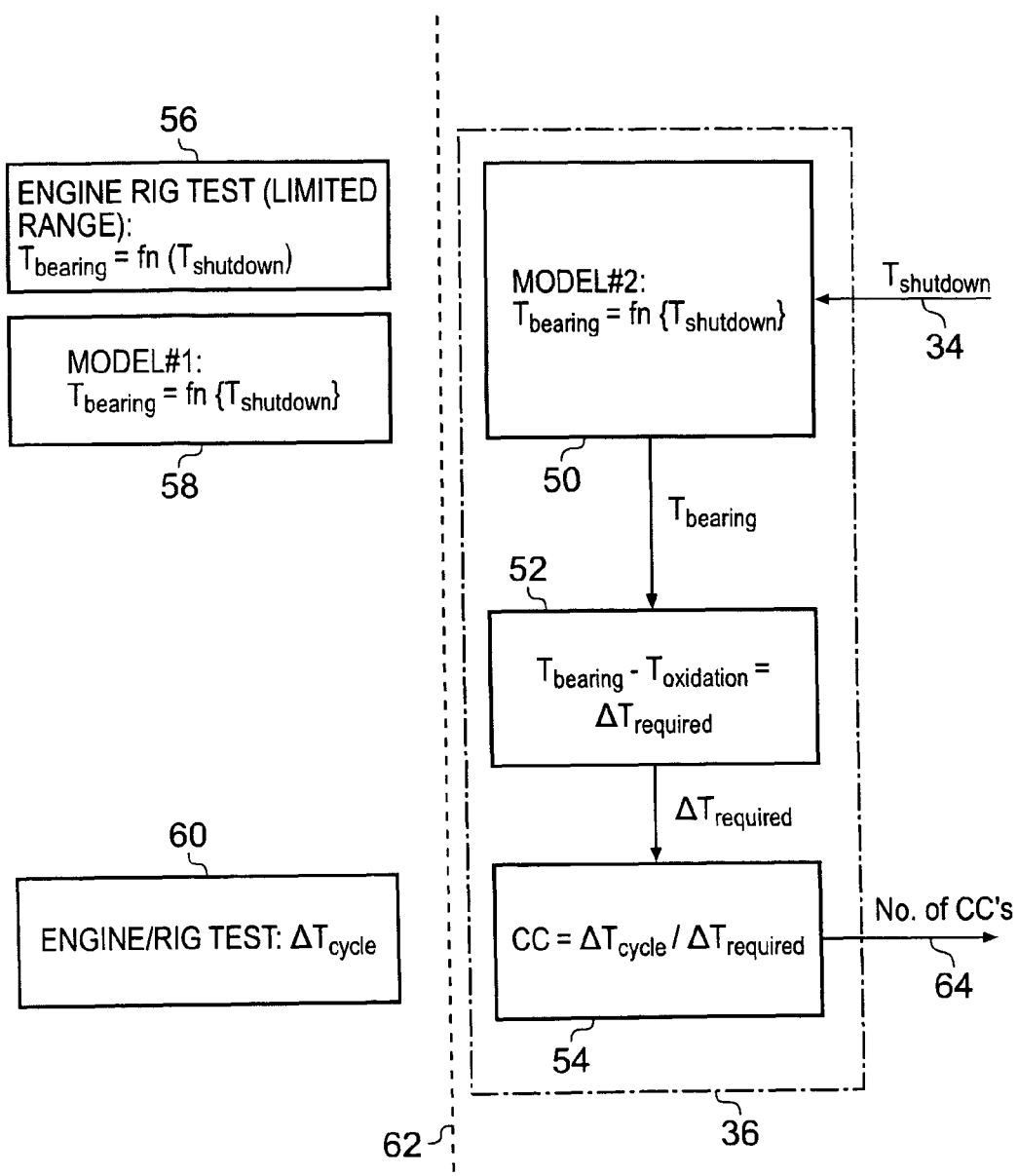
FIG. 2 shows a diagrammatic representation of the means for cooling a rotor stage bearing assembly shown in FIG. 1.

FIG. 2 shows a diagrammatic representation of the cooling cycle calculator 36. Boxes 50, 52 and 54 represent the relationships and calculations which form part of the calculator 36.

Boxes 56, 58 represent the basis of the relationships/functions presented in box 50, and box 60 represents the basis of the relationships/functions presented in box 54. A dotted line 62 divides the calculator 36 from the "basis" boxes 56, 58 and 60, to clarify that during operation of the calculator 36 there is no direct/live relationship with the modelling/rig testing.

The calculator 36 is operable to receive a signal 34 representative of the temperature of the turbine duct 24 at engine shutdown ($T_{shutdown}$). That is to say the temperature of the wall of the turbine duct 24 immediately before the fuel supply has been cut off to the combustor 14. The calculator 36 is operable to output a signal 64 representative of a required number of cooling cycles (CC's) to be performed by the engine 10. In use the signal 64 is transmitted via the transmission means 40 to the starter motor 26. The starter motor 26 is operable to turn the engine 10 over via the coupling means 30 to perform the number of cooling cycles calculated by the calculator 36. For the avoidance of doubt, a cooling cycle is defined as the rotation of the shaft 18 (and hence the compressor 12 and turbine 16) at engine start up speed for a given duration, which is typically about 30 seconds.

Rotation of the compressor 12 will cause cool air to be forced through the turbine 16. The combustion section 14 is not operated as part of the cooling cycle; that is to say no fuel is injected and hence no combustion performed, so no heat is generated. The action of cool air through the turbine 16 directly cools the turbine components. In particular the rotor 17 is directly cooled, and the bearing assembly 22 is indirectly cooled by the removal of heat from the rotor 17 which it carries.

In order to translate engine shutdown temperature ($T_{shutdown}$) to the required number of cooling cycles (CC's), the calculator 36 relies on a number of relationships implicitly or explicitly stored within it. For example, if the calculator 36 is an electronic device the relationships are present in the coding of the device; if the calculator 36 is a look up table or graph, the relationships are implicit within the data stored in the table or graph.

The expected peak bearing assembly 22 temperature ($T_{bearing}$) is calculated as a function of $T_{shutdown}$. However, there is no direct physical connection between the turbine duct wall 24 and the bearing assembly 22. Hence the relationship between $T_{shutdown}$ and the expected peak temperature $T_{bearing}$ is extremely complicated to determine theoretically since i) $T_{shutdown}$ is directly indicative only of the air temperature in the engine, ii) the air is static, and iii) the engine components are all at different temperatures. Additionally, it was hitherto unknown to correlate $T_{shutdown}$ to the expected peak bearing temperature $T_{bearing}$ since there was no reason to do so.

However, in support of the present invention engine rig tests were performed with a highly specialised rig comprising an instrumental bearing assembly 22, rotor 17 and duct 24. Thus it was determined that the key driver of peak bearing assembly temperature $T_{bearing}$ was the temperature of the turbine rotor stage/disc 17 which is carried by the bearing assembly 22.

The rotor disc temperature is not a parameter which is measured in production engines, its measurement requiring specialised instrumentation. Nor is rotor disc temperature calculated from other parameters on production engines. Even if they were, knowing the bearing assembly or rotor disc temperature at engine shutdown is not necessarily indicative of expected peak bearing temperature $T_{bearing}$, since $T_{bearing}$ is potentially dependent upon the temperature of a great many engine components in heat conduction communication with the bearing assembly. Hence in order for the relationship between rotor disc temperature and $T_{bearing}$ to be useful to a user, it must be possible for the user to, either implicitly or explicitly, correlate rotor stage/disc 17 temperature (and hence bearing 22 temperature) to a parameter which can be measured by the user, such as $T_{shutdown}$.

The rig tests provided a correlation between $T_{shutdown}$, rotor disc/stage temperature and $T_{bearing}$. $T_{shutdown}$ and rotor stage temperature was recorded when the engine was switched off, and the peak bearing temperature $T_{bearing}$, which is reached some time after engine shutdown, was also recorded. This was performed for a number of engine power ratings and for a number of engine operation durations (for example: 20 seconds, 1 minute, 2 minutes, 10 mins etc). Thus a relationship presented in box 56 of FIG. 2 was generated for a limited range of engine conditions.

A thermal model (MODEL#1) was also developed to predict $T_{bearing}$ for all engine conditions. However, given the complex relationship between $T_{shutdown}$, rotor stage temperature and $T_{bearing}$ the model needed significant correction based on the engine rig test results to produce MODEL#2 (box 50) which is operable to more reliably predict $T_{bearing}$.

The actual bearing assembly temperature must not exceed the oxidation temperature $T_{oxidation}$ of the lubricant, $T_{oxidation}$ being predetermined during additional experimental work. As illustrated in box 52, the difference between $T_{bearing}$ and $T_{oxidation}$ determines the required temperature drop $\Delta T_{required}$ to avoid oxidation of the lubricant. That is to say $\Delta T_{required}$ is temperature drop which would be required if the bearing assembly 22 reached $T_{bearing}$. Of course the aim of the present invention is to prevent the bearing assembly 22 achieving $T_{bearing}$. Hence $\Delta T_{required}$ is indicative of the amount of heat that must be removed from the engine to limit the bearing assembly temperature to a value below $T_{oxidation}$.

In the embodiment shown in FIG. 1 the cooling means is a compressor 12 that drives cooling air over the turbine rotor stage 17. In support of the present invention further rig and engine tests (indicated by box 60) were executed to determine the amount of cooling which the compressor will deliver in a cooling cycle. Thus a relationship to calculate the amount of cooling cycles required, and the duration of required cycles in order to prevent bearing assembly temperature exceeding $T_{oxidation}$, can be established as represented by box 54.

Thus knowing $T_{shutdown}$, a value of number of required cooling cycles can be calculated. Considerable skill and effort is required to generate the correlation between $T_{shutdown}$ and the number of required cooling cycles. Also determining that it is the rotor stage 17 which must be cooled in order to control the bearing assembly 22 temperature also required considerable skill and effort. It is apparent that many factors contribute to the bearing assembly 22 temperature. Determining that rotor stage/disc temperature was a key contributor to bearing assembly 20 temperature was essential to the process of determining how to tackle degradation of the bearing lubricant and bearing 22 performance. Without this key knowledge it would be impossible to know that the compressor 12 could be used to efficiently (and indirectly) cool the bearing assembly 22.

Figure 3:
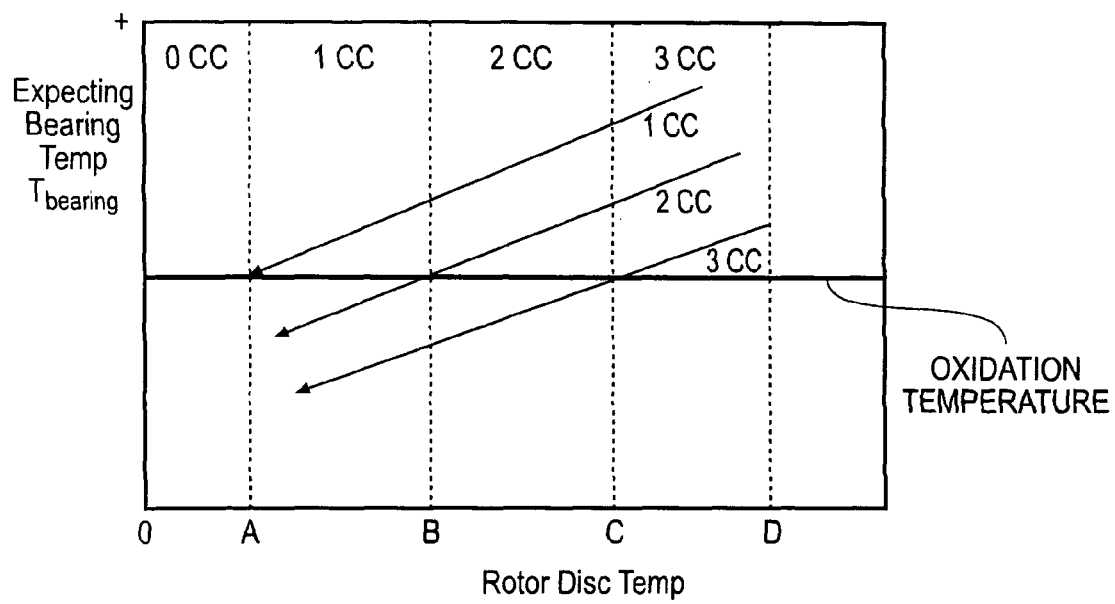
FIG. 3 shows a relationship between rotor disc temperature and bearing temperature which forms a part of the means of FIG. 1 and FIG. 2.

FIG. 3 presents a relationship typical for an example engine build between rotor stage (or rotor disc) temperature and expected peak bearing temperature $T_{bearing}$, overlaid with the oxidation temperature $T_{oxidation}$ and the required number of cooling cycles to maintain bearing temperature below the oxidation temperature $T_{oxidation}$. Since the rotor disc and bearing assembly are physically connected by a heat conduction path, it is relatively straightforward to determine the relationship between the rotor disc temperature and expected bearing assembly temperature, but rather more complex to establish a relationship between rotor disc temperature or bearing assembly temperature to $T_{shutdown}$. FIG. 3 illustrates that up to rotor disc/stage temperature A, zero cooling cycles are required. Between temperature A and B, a maximum number of 1 cooling cycles would be required. Between temperature B and C a maximum number of 2 cooling cycles are required. Between temperature C and D a maximum number of 3 cooling cycles are required. Above temperature D more than 3 cooling cycles are required. The exact temperatures will depend on the engine build in terms of the heat conduction paths, the speed the rotor turns over the compressor rotors 13 and the mass flow of air delivered by the compressor 12 to the turbine rotor stage 17. However, in one example A=190K, B=240K, C=305K and D=375K.

As discussed above, such a relationship is, of course, only of use to the user if the rotor disc temperature is correlated to a temperature which can be measured in service, for example, the turbine duct temperature $T_{shutdown}$. In support of the present invention, such a relationship was generated by the rig tests and MODEL#1 represented by boxes 56,58 respectively of FIG. 2.

Figure 4:
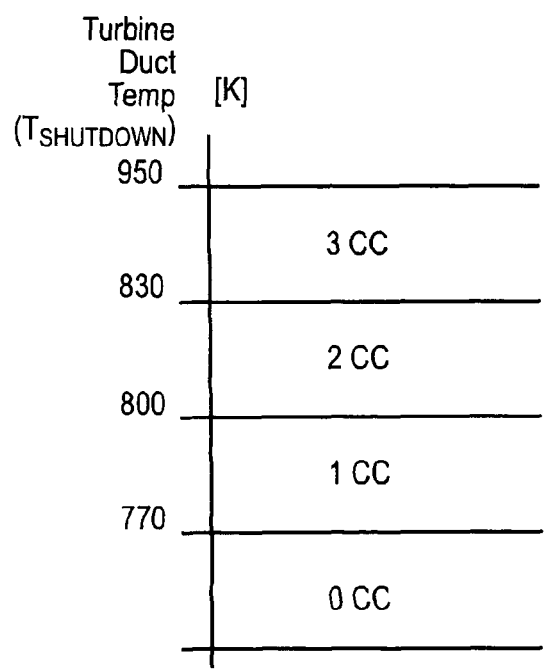
FIG. 4 which represents a relationship used by the means in one embodiment of the present invention, between turbine duct temperature and required number of cooling actuation cycles of the cooling means.

The correlation may be provided as a simple to use relationship as presented in FIG. 4. This indicates that for one example of engine for $T_{shutdown}$ up to 770K, no cooling cycles are required. For temperatures between 770K and 800K a maximum of 1 cooling cycle is required. For $T_{shutdown}$ between 800K and 830K a maximum of 2 cooling cycles are required and between $T_{shutdown}$ 830K and 950K a maximum of 3 cooling cycles are required. Above 950K more than 3 cooling cycles are required. However in this example 950K is excessively hot and is indicative of severe over use of the engine, and is thus rarely achieved.

The cooling cycle is achieved by actuating/operating the compressor 12 with the starter motor 26. In this example the starter motor is actuated for no longer than 30 seconds per cooling cycle. There is a dwell time of no more than three minutes between each cooling cycle/actuation to allow for heat to be passed into the static air contained within the turbine 16.

For a different example the cooling cycles may be of different duration and have a different dwell time between actuations. That is to say the actuations may be of the same duration or different for each subsequent cycle. The dwell time between cycles may be constant or vary. The total time between engine shutdown and completion of cooling (that is to say, the completion of the cooling cycles) may be less than fifteen minutes.

Thus if the expected bearing assembly 22 temperature is greater than a predetermined temperature which will result in oxidation of lubricant within the bearing assembly 22, the present invention provides a means which is operable to instruct the cooling means to operate to limit bearing assembly 22 temperature to the predetermined temperature. Hence the means for cooling a bearing assembly of the present invention enables a user or engine control system to cool a temperature sensitive component (for example, a bearing assembly) in the most time efficient manner and with the least number of cooling cycles. Thus the temperature sensitive component is protected and the time for the complete engine shutdown procedure (that is to say, the time from combustor extinction to the end of the last necessary cooling cycle) is minimised.

In the specific example shown above the gas turbine engine is shown as having a single shaft 18 and a single turbine rotor stage 17. However, this by way of example only. The present invention is equally applicable to gas turbine engines with multiple shafts and a plurality of turbine rotor stages. In such embodiments the temperature sensor 32 may be located between turbine rotor stages. In particular it may be located between a high pressure turbine rotor and a low pressure turbine rotor on the turbine duct wall 24.

It should be appreciated that in an engine build where several turbine rotors 17 are mounted on a single or multiple bearing assemblies 22, the process of determining which component is the key contributor for temperature raise in each bearing assembly 22, and thus by how much the temperature is expected to raise in each bearing assembly 22, is yet more complicated. Hence it is surprising that it is possible to cool a bearing assembly 22 to an optimal temperature by cooling a turbine rotor stage 17 which it carries, in a predetermined process, the duration of which is dependent upon turbine duct temperature at engine shutdown. Since the prior art teaches only of actuating the gas turbine compressor for a fixed amount of time following every engine operation, means according to the present invention which allow for the engine to be cooled only for the required amount, and in some situations, not at all, are highly desirable.

In an alternative embodiment an auxiliary motor external to the gas turbine engine may be employed to actuate the compressor 12 during the cooling cycles.

The invention claimed is:

1. A bearing assembly cooling apparatus, the bearing assembly supporting a rotor stage of a gas turbine engine after engine shutdown, wherein the engine comprises a combustion section, a compressor for delivery of air to the combustion section, and a bearing assembly supporting a rotor stage, the bearing assembly cooling apparatus comprising:
    a temperature sensor located on a turbine duct wall downstream of an exit from the combustion section such that the temperature sensor extends into a gas path, the temperature sensor generating a signal representative of turbine duct temperature at engine shutdown, a cooling cycle calculator that determines a duration for cooling at engine shutdown as a function of the signal representative of the turbine duct temperature at engine shutdown, and a cooler comprising the compressor operable to deliver cooling air to the rotor stage after engine shutdown for the duration for cooling and thereby limit the amount of heat conducted to the bearing assembly such that a bearing assembly temperature is limited to below a predetermined temperature.

2. The bearing assembly cooling apparatus according to claim 1, wherein the bearing assembly, in use, is supplied with lubricant, and the bearing assembly temperature is limited to the predetermined temperature such that the lubricant temperature is maintained below the oxidation temperature of said lubricant.

3. The bearing assembly cooling apparatus according to claim 1, wherein the cooling cycle calculator comprises:

a) a determiner that determines a rotor stage temperature after engine shutdown as a function of the signal representative of turbine duct temperature immediately prior to engine shutdown;

b) a determiner that determines an expected bearing assembly temperature after engine shutdown based upon the determined rotor stage temperature;

c) a determiner that determines the cooling required to limit the bearing assembly temperature to the predetermined temperature, and d) a determiner that determines the duration of operation of the compressor to limit the bearing assembly temperature to said predetermined value.

4. The bearing assembly cooling apparatus according to claim 3, wherein when the expected bearing assembly temperature is greater than the predetermined temperature, then the compressor operates to limit the bearing assembly temperature to said predetermined temperature.

5. The bearing assembly cooling apparatus according to, claim 1, wherein the cooler further comprises an engine starter motor operable to actuate the compressor.

* * * * *